United States Patent [19]

Boulos et al.

[11] Patent Number: 4,866,010

[45] Date of Patent: Sep. 12, 1989

[54] NICKEL ION-FREE BLUE GLASS COMPOSITION

[75] Inventors: Edward N. Boulos, Troy; Patricia B. Reid, Canton; Robert F. Tweadey, Farmington Hills, all of Mich.

[73] Assignee: Ford Motor Company, Dearborn, Mich.

[21] Appl. No.: 312,560

[22] Filed: Feb. 17, 1989

Related U.S. Application Data

[63] Continuation-in-part of Ser. No. 134,599, Dec. 16, 1987, abandoned, which is a continuation of Ser. No. 741,599, Feb. 19, 1985, abandoned.

[51] Int. Cl.$^4$ ............................................. C03C 3/087
[52] U.S. Cl. ...................................................... 501/71
[58] Field of Search .......................................... 501/71

[56] References Cited

U.S. PATENT DOCUMENTS

| | | |
|---|---|---|
| Re. 25,312 | 2/1957 | Duncan et al. ............ 501/71 |
| 2,524,719 | 11/1946 | Tillyer ............................ 501/71 |
| 2,923,635 | 2/1960 | Beck et al. ..................... 501/71 |
| 2,956,892 | 10/1960 | Duncan ........................... 501/68 |
| 3,291,621 | 12/1966 | Hagedorn ....................... 501/71 |
| 3,296,004 | 1/1967 | Duncan ........................... 501/71 |
| 3,296,005 | 1/1967 | Duncan et al. ................ 501/69 |
| 3,328,150 | 6/1967 | Rough ............................. 65/178 |
| 3,466,180 | 9/1969 | Hagedorn et al. ............ 501/71 |
| 3,498,806 | 3/1970 | Hammer et al. .............. 501/71 |
| 3,523,779 | 8/1970 | Keshari et al. ................ 501/71 |
| 3,628,932 | 12/1971 | Inoue et al. ................... 501/71 |
| 3,723,142 | 3/1973 | Kato et al. ..................... 501/71 |
| 4,104,076 | 8/1978 | Pons ................................ 501/71 |
| 4,339,541 | 7/1982 | Dela Ruye ..................... 501/71 |

FOREIGN PATENT DOCUMENTS

| | | |
|---|---|---|
| 516737 | 9/1955 | Canada . |
| 568513 | 1/1959 | Canada . |
| 570195 | 2/1959 | Canada . |
| 618642 | 4/1961 | Canada . |
| 684730 | 4/1964 | Canada . |
| 711746 | 6/1965 | Canada . |
| 802275 | 12/1968 | Canada . |
| 1331492 | 6/1970 | United Kingdom . |

OTHER PUBLICATIONS

"Color in Business, Science & Industry", Deane, B. Judd & Gunter Wyszecki, 3 Ed., John Wiley & Sons, pp. 170-172, 377-378.

"Handbook of Colorimetry", Color Measurement Laboratory, Massachusetts Institute of Technology, 1936, The Technology Press.

"An Introduction to Color", Ralph M. Evans, John Wiley & Sons, pp. 105-106.

*Primary Examiner*—Mark L. Bell
*Attorney, Agent, or Firm*—Peter D. McDermott; Roger L. May

[57] ABSTRACT

A blue glass composition is disclosed. This blue glass composition is based on a standard formulation for soda/lime silica glass, except that neither the basic glass composition nor the coloring components therefor contains nickel. The blue glass color is developed by using coloring components consisting essentially of 0.3-0.6% $Fe_2O_3$, 0.004-0.008% $Co_3O_4$, and 0.0001-001% Se. The particular blue color of the glass is a neutral blue having a dominant wavelength of 482 nm±1 nm, color purity of 13%±1% and transmission (T) equal to at least 54%±1% using Illuminant C (corrected to 0.25 inch glass thickness).

1 Claim, No Drawings

NICKEL ION-FREE BLUE GLASS COMPOSITION

This is a continuation-in-part of patent application Ser. No. 134,599 filed Dec. 16, 1987, now abandoned, which was a continuation of patent application Ser. No. 741,599 filed Feb. 19, 1985, now abandoned.

INTRODUCTION

Technical Field

The present invention is directed to a glass composition which has a certain neutral blue body color. The glass composition is nickel ion-free, such that it can be tempered without breakage at sites where nickel stones might otherwise exist.

BACKGROUND OF THE INVENTION

Glass compositions having various body colors are used, for example, by architects in glazing buildings. Normally, the color selected by the architect serves several functions. A first function of the color is to make the glass aesthetically pleasing when viewed from the exterior of a building. Aesthetics will determine the acceptability of a desired particular glass color and, in part, the desired intensity of the color. A second function is to reduce the amount of heat absorbed from the exterior of the building to the interior of the building, so that the air conditioning load in the building is reduced. Generally, more color added to glass results in greater heat absorption. In addition, while color may readily be added to glass to serve these functions, the glass when colored still must have an appropriate visible light transmission value. Also, the glass must be structurally sound.

Those skilled in the art of formulating glass compositions are familiar with various suitable glass colorants. Thus, a small amount of cobalt oxide is known to produce a cold blue color widely considered unattractive and undesirable for architectural and certain other uses. A high concentration of nickel is known to produce black glass. Selenium can produce pink or red and ferrous oxide can produce green glass and contribute to advantageous solar load control properties. The glass color produced by a mixture of colorants will vary with both the amount and relative proportions used. As noted above, varying the choice and amount of colorants also affects the light transmission value of the glass. As discussed further below, however, the effect on glass color and transmission value of mixing multiple colorants and/or varying the amount or relative proportions of the colorants often is not reliably predictable.

In the following discussion, certain terms well known to the skilled of the art are used to describe color in glass. Two terms or specifications for color, dominant wavelength and excitation purity, are derived from tristimulus values that have been adopted by the International Commission on Illumination. The numerical values of these two specifications for a given glass color can be determined by calculating the trichromatic coefficients, X, Y and Z, from the so-called tristimulus values of that glass color. The trichromatic coefficients X and Y then are plotted on a chromaticity diagram and numerically compared with the coordinates of Illuminant C, an established standard light source. (The trichromatic coefficient Z value can be obtained by adding X and Y and subtracting the total from 1.0.) This comparison provides the numerical values of the excitation purity and dominant wavelength of the glass color.

Thus, a glass color may be specified either by its coefficients X and Y or by its dominant wavelength and purity values. The lower the excitation purity of a color, the closer it is to the Illuminant C standard and the closer it is to being a so called neutral color.

An understanding of the foregoing terms and definitions thereof may be had by referring to the Handbook of Colorimetry prepared by the staff of the Color Measurement Laboratory, Massachusetts Institute of Technology. This book was printed in 1936 by the Technology Press, Massachusetts Institute of Technology, Cambridge, Mass. Also, a good explanation and list of definitions is given in Color in Business, Science and Industry, (3 Ed.) John Wiley & Sons (especially pages 170–72, 377–78). Useful also is An Introduction to Color, John Wiley & Sons (especially pages 105–106).

Those skilled in the art know that adding or substituting one colorant for another and/or changing the amount or relative proportion of colorants in a glass composition affects not only the color of the glass, i.e., its dominant wavelength and its excitation purity, but also can affect the light transmission (T) of the glass and its structural qualities. Furthermore, there is in many cases substantial complexity and unpredictability in these effects. Thus, for example, even if the proper alteration in the composition of a particular colored glass were determined for achieving a desired color shift, the same alteration, unfortunately, would also alter (for example, unacceptably reduce) the light transmission value of the glass. It may, of course, also undesirably alter the purity of the glass color. In short, all these factors—dominant wavelength, purity and light transmission—are variable and may vary unpredictably with each other. Developing a new glass composition, therefore, having a particular color, certain purity and appropriate light transmission value, is in some cases like searching for a needle in a haystack. An experimental change in the amount or relative proportions of one or more colorants in a glass composition intended to bring one of these numerical values closer to a target value causes one or both the other values simultaneously to drift off target (or further off target).

The difficulty of this task, finding the correct glass composition for a body colored glass having the desired dominant wavelength and excitation purity value and light transmission value, is discussed in U.S. Pat. No. 3,296,004 to Duncan, wherein a neutral brown heat absorbing glass is disclosed. Duncan expressly notes that the development of the particular color required a careful consideration of the transmittance characteristics of the glass and that the amounts of the colorants must be carefully controlled to achieved the desired color (dominant wavelength and excitation purity), transmittance and heat-absorbing characteristics. Thus, for example, Duncan points out that if his glass contained more cobalt oxide than he specifies, the color would be more blue than desired. Considering the glass composition of the present invention for a moment, however, the great unpredictability of this area is well demonstrated by the fact that it employs cobalt oxide in an amount well within the range used by Duncan, yet achieves a blue, not a brown color. That is, the amount of cobalt oxide used by Duncan to produce brown surprisingly yields the attractive neutral blue color of the present invention in combination with the other components of the glass composition of the present invention, notwithstanding that such other components are not normally associated with producing blue coloration.

This inherent unpredictability in achieving specific purity, dominant wavelength and light transmission values simultaneously in a structurally sound glass composition had to be overcome in discovering the glass composition of the present invention. A series of blue glass compositions were fabricated for aesthetic evaluation for automotive and architectural uses and the like. They were exhibited to potential users including numerous architectural firms. From amongst the many samples, one was chosen having a very attractive neutral blue color—the color of the glass composition of the present invention. In particular, it was a blue having a dominant wavelength of 482 nm±1 nm and a purity of 13%±1%. These values correspond to the color coordinates of the glass, i.e., trichromatic coefficients X=0.2799 and Y=0.2947.

At this point, the search for the needle in the haystack, the glass composition of the present invention, had really just begun. The light transmissability of the exhibited glass samples had been largely ignored for purposes of the exhibit so that a desired glass coloration could first be identified. The light transmission value of the selected neutral blue color sample was unacceptable for many intended commercial applications. The task now was to develop a glass composition including appropriate colorants which yielded the same dominant wavelength and the same excitation purity, but with the needed visible light transmission value. As explained above, however, altering the various colorants and the amount and relative proportions in which they were used for purposes of achieving the correct light transmission value simultaneously caused the color, that is the dominant wavelength and purity, to drift off target.

The visible light transmission value of the blue glass of the invention is dictated by an important commercial consideration. Specifically, glass of the same composition had to be suitable for both motor vehicle glazing applications and architectural glazing applications. That is, in order to achieve significant manufacturing cost savings, glass for both architectural glazing applications and automotive glasing applications had to be producible together on the same float glass production line. To use the same glass in both these applications, it had to have visible light transmission at least high enough to meet applicable governmental standards for motor vehicle glazing and yet low enough to provide heat load reduction to meet architectural glazing specifications. Thus, a visible light transmission value (T) of 54%±1% was determined for the glass, using Illuminant C and corrected for one quarter inch thick glass. This meets various applicable architectural standards and, used for one of a pair of 0.09 inch thick glass panels (the other 0.09 inch thick glass panel being clear) in a laminated safety glass windshield, yields the desired neutral blue of the invention with visible light transmission value (T) of at least 70% to meet current U.S. government standards for motor vehicle windshields.

Dozens and dozens of experimental glass compositions were tried without success. The numerous variables effecting color in a glass composition, selection of colorant(s), their amounts, relative amounts, etc. and the unpredictability of the type or degree of change effected by varying one or more of them led to failure after failure. The search continued and dozens and dozens of additional experimental glass compositions were tried. Those skilled in the practical aspects of this art will understand the very considerable time, effort and expense involved in a research and development program of this nature. Still the glass compositions which provided the necessary light transmission together with the selected dominant wavelength and the selected purity were undiscovered. More time and more money and more effort were expended to produce and test dozens and dozens of additional experimental glass compositions. All these also were unsuccessful.

Discovering the glass composition of the invention was particularly difficult since colorants were avoided which were not readily commercially available at reasonable cost. Also, the use of many colorants in small amounts was avoided, since this would add both to manufacturing complexity and to difficulty in accurately measuring the colorants.

Finally, a structurally sound glass composition was produced and tested and found to have the needed light transmission value of 54%±1% in conjunction with the desired neutral blue color (that very attractive neutral blue selected by the panel of users) having dominant wavelength equal to 482 nm±1 nm and purity equal to 13%±1%. Furthermore, as disclosed below, this was achieved using only three colorants, each readily commercially available at reasonable cost and each used in a practical, easily measured quantity.

In the short time since its discovery, this particularly attractive neutral blue glass has been commercialized by the assignee of the present invention and already has found significant commercial success. It is in wide spread and growing architectural use, desirable not only for its intrinsic aesthetic appeal but also for the uniqueness of its color in the architectural field. It is warmer than "cobalt blue" glasses and, importantly, it is structurally sound. In that regard, the glass is nickel free. Those skilled in the art are aware that in most cases the large spandrels of glass used in making windows for buildings have to be tempered. Such spandrels are tempered so that in case they are accidentally broken they will shatter into small, blunt pieces of glass to reduce the risk of injury. If glass is not tempered, it may break into long, thin pieces of glass more likely to cause injury. If the glass contains nickel in its composition, the nickel has a tendency to react with sulfur in the glass to form nickel sulfide. The nickel sulfide settles out in the glass as a defect known as a stone. A stone is a tiny sand-like imperfection in the glass. When glass containing such stones is heated to an elevated temperature and rapidly cooled to temper the same, very high stress concentration is created about the area of each stone. As a result, in many cases, a stone will cause "concentration stresses" which result in a rupture of the glass during its tempering. Of course, if the glass ruptures during tempering, the glass spandrel is destroyed and all of the money spent on producing the spandrel to that point is lost.

In addition to causing breakage during tempering, nickel sulfide stones, when smaller than a certain size, can pass tempering undetected without causing any immediate damage. However, some of these small stones that are formed at high temperature will undergo, through phase transformation, a low temperature phase change when the glass is cooled to room temperature. The transition of nickel sulfide from high to low temperature forms is usually accompanied by a volume expansion of 2 to 4%. This increase in volume can initiate microcracks in the glass which can lead to spontaneous fracture of the tempered glass. This phase transformation is a slow process and can take months or years depending on the size of the stone and its location in the glass. In searching for the glass composition of the present invention, therefore, there was the significant added complication that, for reasons of structural soundness, it had to be nickel free.

U.S. Pat. No. 2,938,808 issued May 31, 1960 for "Glass Composition" and subsequently reissued as U.S. Pat. No. Re.25,312 discloses as a new article of manufacture a neutral color sheet of glass having a thickness in a range of ⅛-¼ inch. The glass is suitable for glazing purposes and has substantially uniform transmission of light in the portion of the spectrum line between 440 and 660 millimicrons, an excitation purity below 7%, a total solar energy transmittance between 40-48%, and a total luminous transmittance between 35-45%. The glass composition disclosed in this patent consists essentially of base ingredients in percent by weight as follows: 60-75% $SiO_2$, 11-20% $Na_2O$, 0-10& $K_2O$, the sum of the $Na_2O$ and the $K_2O$ being 11-21%, 6-16% CaO, and 0-10% MgO, the sum of the CaO and MgO being 6-18%, together with 0.4% $Fe_2O_3$, 0.0076-0.008% $Co_3O_4$, 0.009-0.126% NiO, and 0.005-0.0056 Se at ¼ inch thickness. The patent teaches that the amount of the colorants $Fe_2O_3$, $Co_3O_4$, NiO and Se is greater when the thickness of the sheet is less than ¼ inch and is approximately twice the above listed amounts for each colorant when the thickness of the sheet is ⅛ inch.

U.S. Pat. No. 3,723,142 issued Mar. 27, 1973 for "Neutral Gray Glass" discloses a neutral gray colored heat absorbing glass having a low excitation purity. The glass is defined as consisting essentially of the following base components in percent by weight: 68-75% $SiO_2$, 0-5% $Al_2O_3$, 5-15% CaO, 0-10% MgO, the sum of the CaO and the MgO being 6-15%, 10-18% $Na_2O$, 0-5% $K_2O$, the sum of the $Na_2O$ and the $K_2O$ being 10-20%, together with coloring components of 0.1-0.5% $Fe_2O_3$, 0.003-0.02% $Co_3O_4$, 0.0005-0.001% Se, and negligible NiO. The specification of the patent states that the quantity of NiO should be less than about 0.002% and preferably less than 0.0004%.

U.S. Pat. No. 3,498,806 issued Mar. 3, 1970 to Hammer et al for "Glass Compositions and Process." Various specific compositions are given by Hammer et al for glasses of "generally blue" coloration along with compositions for clear glass and glass of green or other coloring. None of these compositions, however, is the same or even similar to the composition of the glass of the present invention. They differ most notably in both the selection of colorants (using certain colorants not used in the present invention and others which are used) and the amounts and relative proportions of the colorants.

SUMMARY OF THE INVENTION

In accordance with the teachings of this invention, a blue glass composition having no nickel ion contained therein and having a dominant wavelength of 482 nm±1 nm, color purity of 13%±1% and light transmission (T) equal to 54%±1% using Illuminant C corrected to 0.25 inch glass thickness, consists essentially of the following base components in percent by weight: 68-75% $SiO_2$, 0-5% $Al_2O_3$, 5-15% CaO, 0-10% MgO, 10-18% $Na_2O$, 0-5% $K_2O$, where $CaO+MgO$ is 6-15% and $Na_2O+K_2O$ is 10-20%, together with coloring components of 0.3-0.6% $Fe_2O_3$, 0.004-0.008% $Co_3O_4$, and 0.0001-0.001% Se.

DESCRIPTION OF PREFERRED EMBODIMENTS

This invention is directed to a blue body-colored automotive and architectural tinted glass. The glass composition is nickel-free so that nickel ion is not available to react with sulfur to form nickel sulfide stones in the glass which may result in a spontaneous breaking and shattering of the tempered glass. The glass composition which is colored is a basic soda/lime silica glass. The basic materials used in making up the composition are as follows: 68-75% $SiO_2$, 0-5% $Al_2O_3$, 5-15% CaO, 0-10% MgO, 6-15% $CaO+MgO$, 10-18% $Na_2O$, 0-5% $K_2O$, and 10-% $Na_2O+K_2O$.

In accordance with a preferred embodiment of our invention, coloring components were added to the basic composition. Neither the coloring components nor the basic composition contained any nickel ion. The coloring components added included 0.005 wt. % $Co_3O_4$ (50 ppm cobalt), 0.0003 wt. % Se (3 ppm selenium) and 0.42 wt. % iron oxide (Fe When these colorants were mixed and melted with the basic glass composition, the following measurements were obtained using Illuminant C and corrected to 0.25 inch glass thickness transmission (T) equaled 54%±1%. The dominant wavelength was 482 nm±1 nm. The purity of the color was 13%±1%. The target color coordinates for this glass were X=0.2799 and Y+0.2947.

In accordance with the broad teachings of the blue glass composition of our invention, the colorant elements may have the following limits: $Fe_2O_3$ may vary from 0.3 to 0.6 wt. %; cobalt oxide may vary from 0.004 to 0.008 wt. %; the selenium may vary from 0.0001 to 0.001 wt. %. A major factor in this composition, however, is the fact that there is no nickel present. In the absence of nickel, the coloring elements still give a very desirable blue body color to the glass composition.

While a particular embodiment of the novel blue glass composition of the invention has been illustrated and described, it will be obvious to those skilled in the art in the light of the present disclosure that various modifications within the scope of the recited ranges may be made without departing from the invention. It is intended to cover in the appended claims all such modifications and equivalents as fall within the true spirit and scope of this invention.

We claim:

1. A blue glass composition having no nickel ion contained therein and having a dominant wavelength of 482 nm±1 nm, color purity of 13%±1% and light transmission (T) equal to 54%±1% using Illuminant C corrected to 0.25 inch glass thickness, and consisting essentially of the following base components in percent by weight: 68-75% $SiO_2$, 0-5% $Al_2O_3$, 5-15% CaO, 0-10% MgO, 10-18% $Na_2O$, 0-5% $K_2O$, where $CaO+Mgo$ is 6-15% and $Na_2O+K_2O$ is 10-20%, together with coloring components of 0.42% $Fe_2O_3$, 0.005% $Co_3O_4$, and 0.0003% Se.

* * * * *